United States Patent [19]

Sackett, Sr. et al.

[11] 3,802,584

[45] Apr. 9, 1974

[54] CONVEYOR SYSTEM

[75] Inventors: Walter J. Sackett, Sr., Severna Park; Michael J. Sackett, Baltimore, both of Md.

[73] Assignee: The A. J. Sackett & Sons Company, Baltimore, Md.

[22] Filed: Feb. 18, 1972

[21] Appl. No.: 227,466

[52] U.S. Cl................ 214/44 R, 198/43, 198/174, 198/45
[51] Int. Cl............................................. B65g 67/24
[58] Field of Search................................. 198/46–58, 198/43, 168–174, 231, 45; 214/44 R, 44 A

[56] References Cited
UNITED STATES PATENTS

| | | | |
|---|---|---|---|
| 2,930,477 | 3/1960 | Schrader | 198/168 |
| 2,222,316 | 11/1940 | Maguire et al. | 198/168 |
| 3,061,073 | 10/1962 | Wickam | 198/168 X |
| 3,233,873 | 2/1966 | Sackett, Sr. | 198/174 X |
| 3,528,570 | 9/1970 | Pase | 214/44 R |
| 416,301 | 12/1889 | Roberts | 198/231 |
| 866,519 | 9/1907 | Rhodes et al. | 198/231 X |
| 1,822,530 | 9/1931 | Kind | 214/44 R |
| 3,163,280 | 12/1964 | Haugland | 198/1 |
| 2,058,125 | 10/1936 | Beah | 214/44 A |
| 1,222,219 | 4/1917 | Lafont | 198/47 |
| 1,942,590 | 1/1934 | Binger | 198/231 |
| 1,460,952 | 7/1923 | Eustis | 198/173 X |

*Primary Examiner*—Evon C. Blunk
*Assistant Examiner*—W. Scott Carson
*Attorney, Agent, or Firm*—Walter G. Finch, Esq.

[57] ABSTRACT

An improved conveyor system is provided for unloading bulk material from either the bottom or the side of railway cars. The conveyor system is provided with a waterproof housing, within which there is a motor driven continuous chain with L shape flights attached thereto. At one end of the conveyor system, there are located two loading receptacles, one for the bottom unloading of covered hopper railway cars and the other one for the side door unloading of box railway cars. The material is conveyed horizontally or in a horizontal-inclined plane to the opposite end of the conveyor system and is discharged.

7 Claims, 11 Drawing Figures

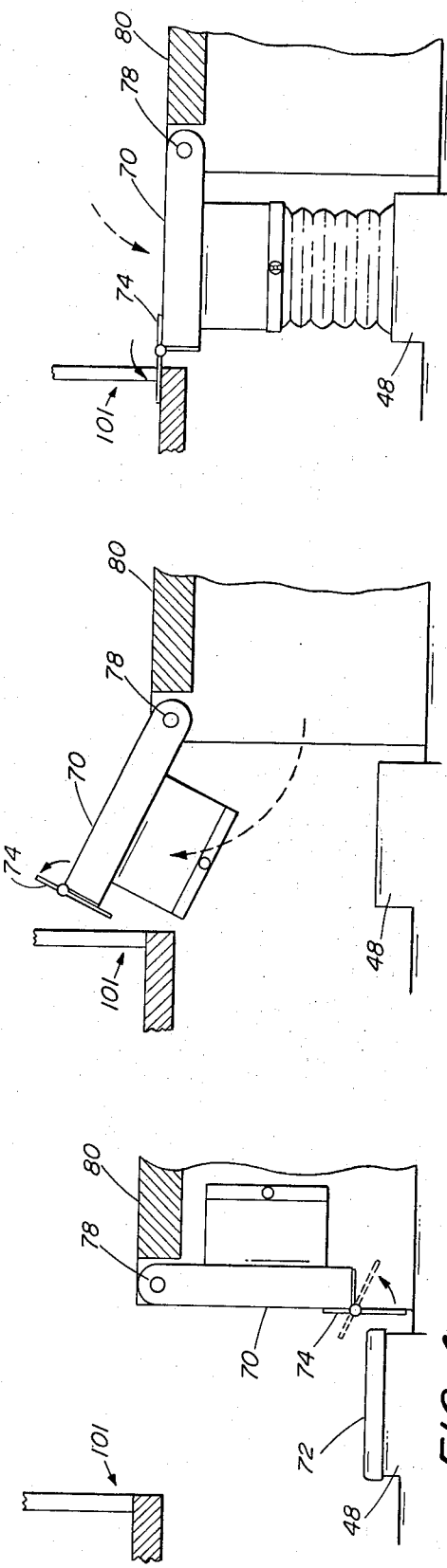
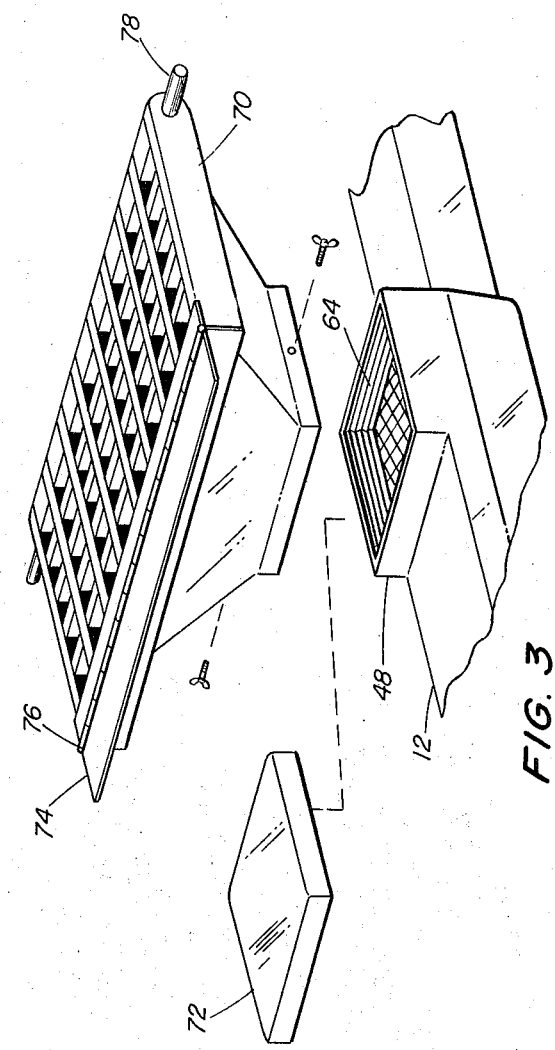

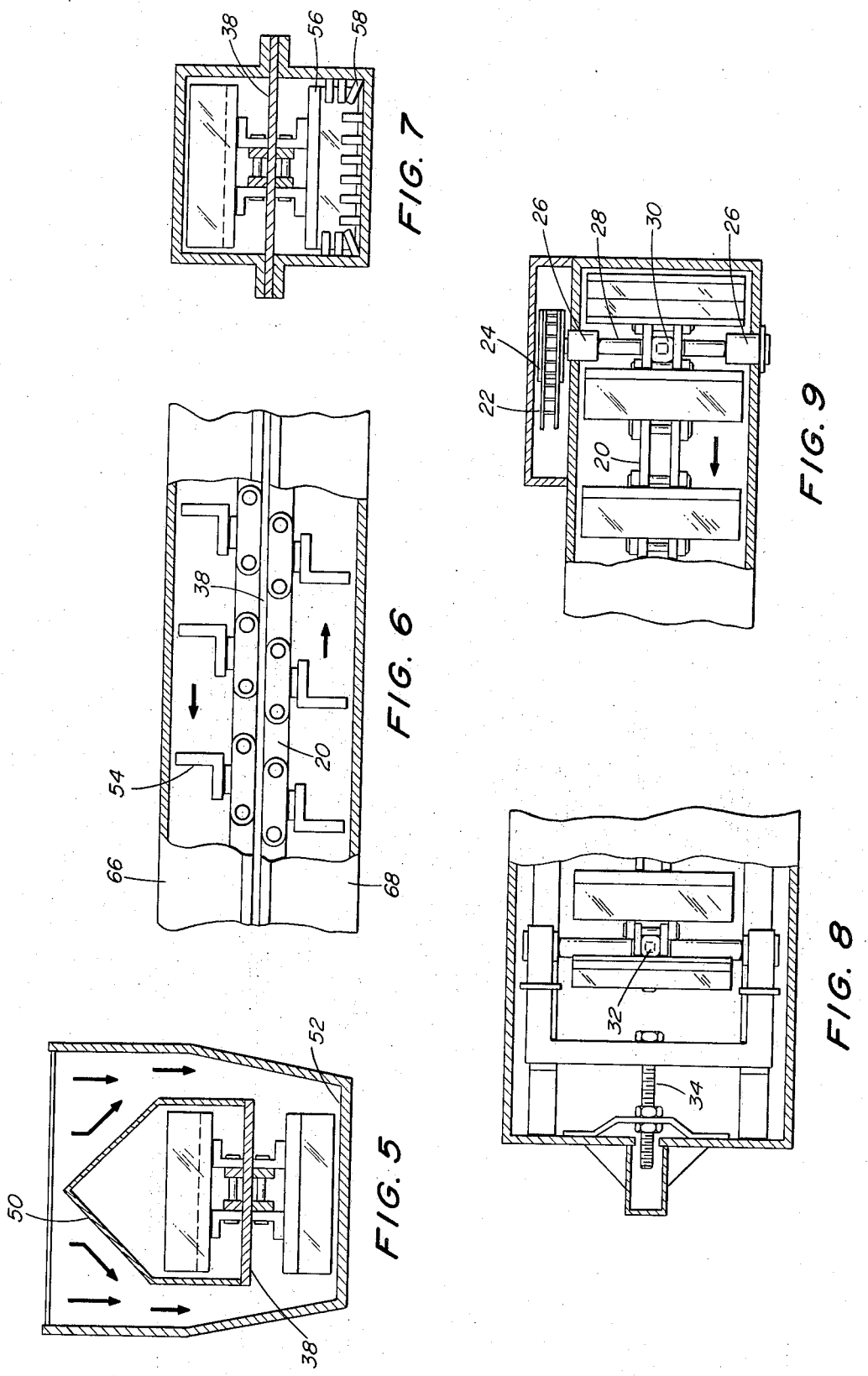

CONVEYOR SYSTEM

This invention relates generally to power-driven conveyor systems, and more particularly it pertains to a fully enclosed chain flight conveyor system for the handling of bulk materials.

Dust and material contamination and losses have been a problem in unloading conveyors in the past. Particularly, chain guides and other structure in the flow path has been difficult to clean. With different materials being interchangeably handled, this factor is of importance.

It is the object of this invention, therefore, to provide a fully enclosed unloading conveyor system of the continuous chain flight type which is easy to clean and maintain.

Another object of this invention is to provide a conveyor system which is fully enclosed thereby conforming to all of the present ecology regulations.

And another object of this invention is to provide a conveyor system which conforms with all of the present ecology regulations in preserving clean air environment.

A further object of this invention is to provide a conveyor system which is capable of either bottom or side unloading of railway cars and which moves the material either horizontally or in a horizontal-inclined plane.

A still further object of this invention is to provide a flanged housing for the conveyor system which also supports and guides the chain flights and which permits easy expansion of its length, and easy change of angle of incline.

Also, it is the object of this invention to provide a conveyor system that is readily accessible for maintenance.

And even another object of this invention is to provide a conveyor system having an undertrack loading receptacle housing which is completely dry inside when surface water covers the rail up to the top of the rail head.

Other objects and attendant advantages of this invention will become more readily apparent and understood from the detailed specification and accompanying drawings in which:

FIG. 3 is a perspective view of the hinged grated receiving hopper used in the side unloading of a railway car;

Figure 1:
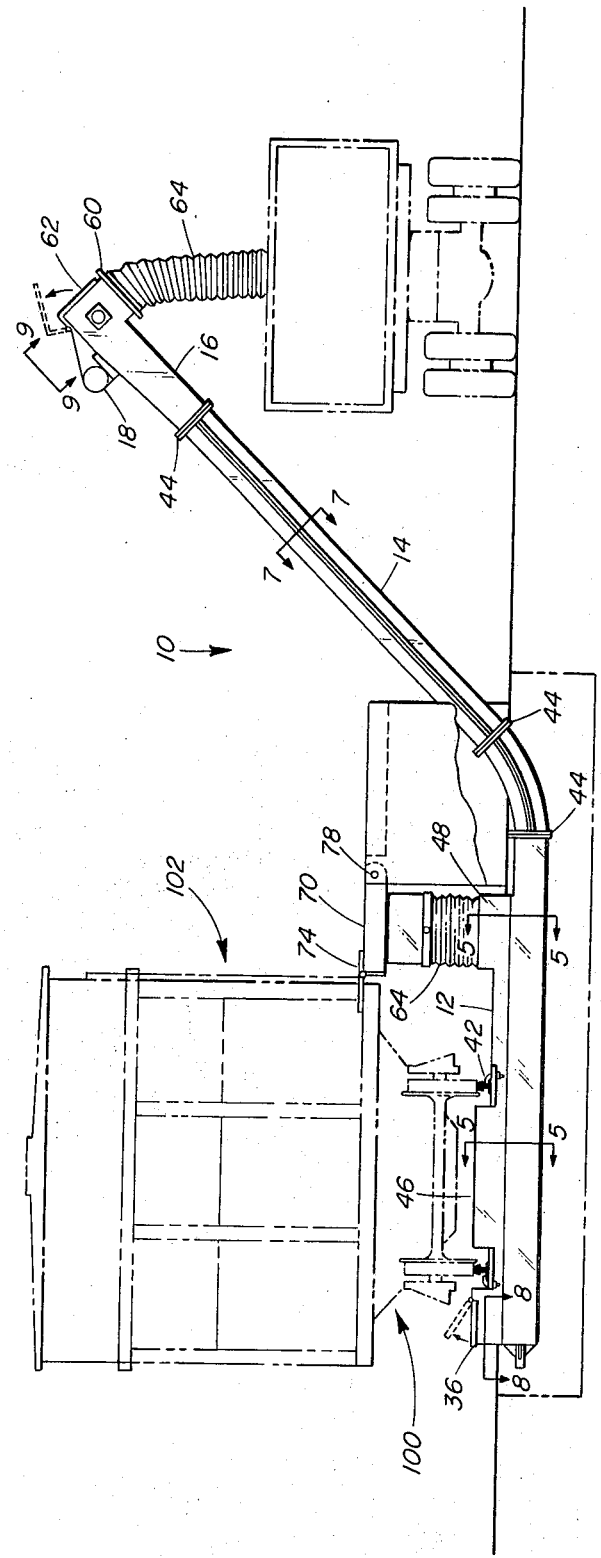
FIG. 1 is a side elevation view of a conveyor system of this invention showing its capability of bottom or side unloading of a railway car.
Figure 2:
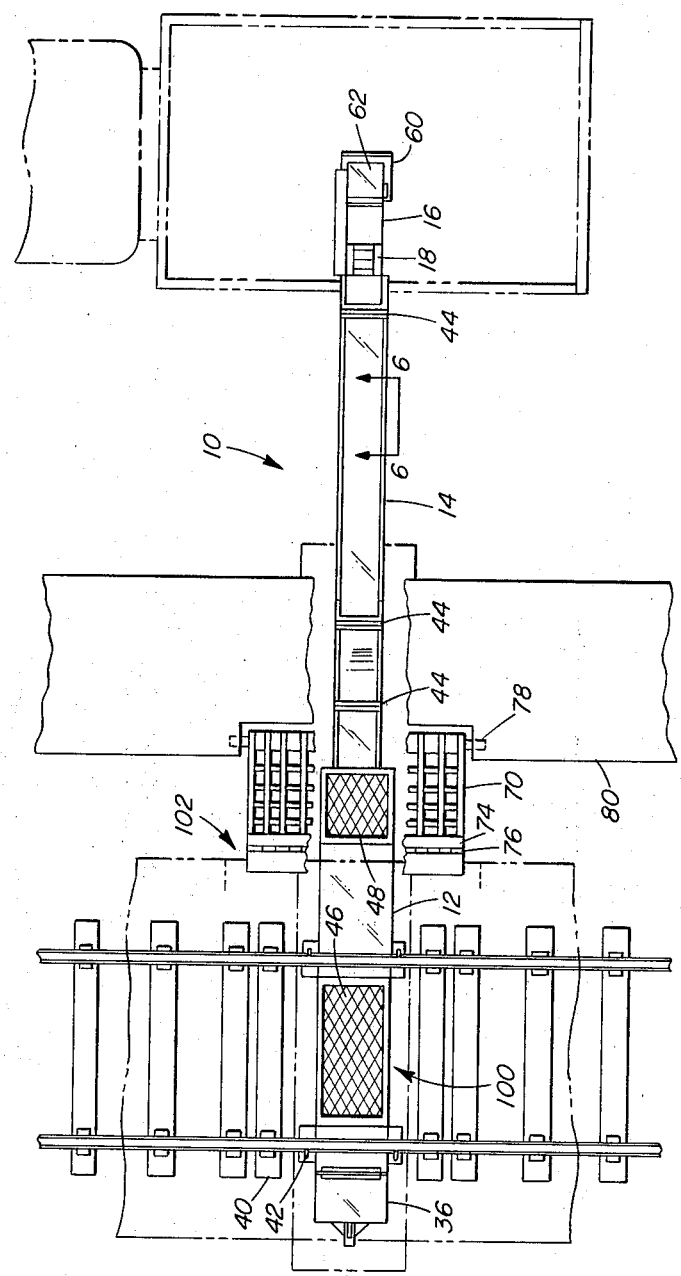
FIG. 2 is a top view of FIG. 1.

FIGS. 4a, 4b, and 4c show the sequence of positioning of the hinged grated receiving hopper;

FIG. 5 is a cross section taken along line 5—5 of FIG. 1 showing the conveyor receiving hoppers;

FIG. 6 is a side section taken along line 6—6 of FIG. 2 showing the continuous chain;

FIG. 7 is a cross section taken along line 7—7 of FIG. 1 showing the cleaning flight with tungsten carbide teeth;

FIG. 8 is a plan section taken along line 8—8 of FIG. 1 showing the chain tension adjustment; and FIG. 9 is a plan section taken along line 9—9 of FIG. 1 showing the chain drive assembly.

Referring now to the drawings, there is shown in FIGS. 1 and 2, an improved bulk material unloading conveyor system 10. The unloading conveyor system 10 consists basically of three parts, namely an enclosed conveyor receiving housing 12, an enclosed intermediate conveyor housing 14, and an enclosed drive and discharge housing 16.

A motor 18 drives a continuous conveyor chain 20 by means of a motor drive chain 22, a drive wheel 24, a shaft 28 mounted by bearings 26, and a drive sprocket 30 as shown best in FIG. 9. Chain 20 is supported at the opposite end of the conveyor system 10 by an idler sprocket 32 as shown in FIG. 8. Tension on the conveyor chain 20 can be adjusted by means of a screw assembly 34 also shown in FIG. 8. Access for adjustment of the screw 34 is through a door 36 shown in FIG. 2.

The intermediate conveyor housing 14 is composed of paired half shells 66 and 68 having mating side flanges 44, as best shown in FIG. 2. A hardened steel center plate 38, running its entire length, which separates, supports and guides the continuous chain 20, is mounted and bolted between these opposed shells 66 and 68.

The rectangular shape of the housing halves 66 and 68 conforms to the rectangular shape of the L flights 54 which are attached to the continuous chain 20. The mating side flanges 44 of the shell halves 66 and 68 provide for easy accessability and periodic inspection of the interior of the housing 14.

The conveyor system 10 is installed by merely spreading a pair of railroad cross ties 40 as shown in FIG. 2, placing the conveyor receiving housing 12 into its place and securing it by means of the rail clamps 42, as shown in FIGS. 1 and 2. The intermediate conveyor housing 14 and the drive and discharge housing 16 are attached by means of bolting the flanges 44 together. The length and the angle of incline of the conveyor chain 20 can be altered by the pre-selection of the various components.

There are two conveyor receiving hoppers, one hopper 46 is located between the railroad tracks for the bottom unloading of covered hopper railway cars 100, as shown best in FIGS. 1 and 2. The other hopper 48 is positioned for the side door unloading of box railway cars 102, also shown in FIGS. 1 and 2. In conjunction with the side door unloading, there is a hinged grated receiving hopper 70 with a funnel attached as shown in FIGS. 3, 4a, 4b, and 4c. It is so constructed that it can swing down for storage and swing up when it is to be used.

Hopper 70 is constructed of vertical steel bars with openings for the bulk material to pass through and to support the passage of the front end loaded into and out of the box car. The hopper 70 is pivoted by a pin 78 onto a dock 80, as shown in FIGS. 4a, 4b, and 4c. On the opposite end of hopper 70 there is mounted a metal plate 74 with a piano type hinge 76 which allows it to rotate. FIGS. 4a, 4b, and 4c, illustrate the positioning of the hopper 70 into the box railway car 102 having a side door opening.

The bulk material is directed through the hinged grated receiving hopper 70 and empties into hopper 48 attached to conveyor receiving housing 12. As the bulk material enters the hopper 48, it is diverted by means of a shield plate 50 to the bottom of the conveyor 52. It is then moved along on the bottom half shell 68 by the action of the L-shaped flights 54 which are attached to the continuous conveyor chain 20. The conveyor chain assembly is shown in FIG. 6.

To insure that the bulk material keeps moving freely and does not clog the paired half shells 66 and 68, there are two cleaning flights 56 attached to the chain 20, as shown in FIG. 7. These two L-shaped flights 56 have a series of tungsten carbide teeth 58 attached as shown best in FIG. 7. The teeth 58 are staggered on each of the two flights so as to clean the entire housing shell 14. The conveyor housing shell 14 also may be easily flushed out with water for strict control of product quality.

The bulk material is discharged from an opening 60. A door 62 is provided that will open if there is an overflow or back-up of the material. This door 62 also provides an access for maintenance purposes.

A further precaution against dust and contamination, a folding, bellows type flexible sleeve arrangement 64 as shown in FIGS. 1, 3, and 4c is provided at the discharge and entry of hoppers 70 and 48.

When the conveyor is not in use, the covers 72 are placed over each of the two receiving hoppers 46 and 48, making the conveyor system 10 completely waterproof.

Obviously many modifications and variations of the present invention are possible in light of the above teachings. It is, therefore, to be understood that within the scope of the appended claims the invention may be practiced otherwise than as specifically described.

What is claimed is:

1. In a bulk material conveyor system having an input end and an output end and useful for unloading railways cars movable on a pair of rail members, which cars contain bulk material and each have material discharge capability from beneath and also from the sides thereof, a conveyor apparatus which is water, dust, and contamination proof and comprises:

a housing formed of a pair of opposed rectangular half shell sections;

a hardened plate separating said rectangular half shells so as to form upper and lower passageways;

means for holding said rectangular half shells and hardened plate together to form upper and lower passageways;

a continuous chain conveyor means positioned in said passageways and supported by said plate;

means for driving said chain conveyor means;

sprocket means at each end of said conveyor means and holding said conveyor means generally in a loop configuration;

a plurality of spaced flights on said conveyor means for moving bulk material thereon;

a first bulk material receiving hopper disposed at the input end of said housing and positionable below the railway cars for receiving bulk material discharged from one of said cars from a discharge port located beneath said car; and, a second bulk material receiving hopper disposed between the first hopper and the output end of the conveyor system, the second hopper being positionable on one side of the railway cars for receiving bulk material discharged from one of said cars from a discharge port located on the side of said car, the second bulk material receiving hopper comprising a retractable grating member surmounting the receiving hopper, dock means, hinge means joining the grating member and dock means whereby the grated member can be pivotally moved from a stored position to a position of use, and means for engaging the railway car and for assisting in the support of said hopper during discharge of bulk material from the side of the railway car.

2. The system of claim 1 and additionally including a cover positionable over the grating member when said second hopper is not in use.

3. The system of claim 1 wherein certain of said conveyor flights are fitted with teeth extending from free end edges of the flights toward the adjacent surfaces of the passageways to insure that the passageways are kept clear of clogging material.

4. The system of claim 1 wherein the first and second receiving hoppers are provided with shield plates positioned on respective portions of the hardened plate and located in the upper passageway to preclude entry of the bulk material into the upper passageway and to divert bulk material to the lower passageway.

5. A bulk material conveyor system as recited in claim 1, wherein at least one section of said housing of half shells is curved so that said bulk material can be conveyed to discharge at a point differing in height from the other sections of said conveyor means.

6. A bulk material conveyor system as recited in claim 1, and means for unloading said conveyor means along said conveyor system.

7. A bulk material conveyor system as recited in claim 1, wherein each of said solid flights are L-shaped with the outside portion of one leg thereof being secured to said conveyor means and in a plane parallel with the plane of the conveyor means and the other leg thereof extending perpendicularly from the conveyor means into said passageways to engage and move the bulk material.

* * * * *